(12) United States Patent
McMahan et al.

(10) Patent No.: US 9,094,174 B2
(45) Date of Patent: Jul. 28, 2015

(54) BONDING ENGINE CONFIGURED TO PREVENT DATA PACKET FEEDBACK DURING A LOOPBACK CONDITION

(75) Inventors: Dennis B. McMahan, Huntsville, AL (US); Jerry L. Greer, Huntsville, AL (US); Darrin L. Gieger, Huntsville, AL (US); Thomas Detwiler, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 751 days.

(21) Appl. No.: 13/037,477

(22) Filed: Mar. 1, 2011

(65) Prior Publication Data

US 2012/0224573 A1 Sep. 6, 2012

(51) Int. Cl.
*H04L 1/00* (2006.01)

(52) U.S. Cl.
CPC ............ *H04L 1/0061* (2013.01); *H04L 1/0079* (2013.01)

(58) Field of Classification Search
None
See application file for complete search history.

(56) References Cited

U.S. PATENT DOCUMENTS

| | | | |
|---|---|---|---|
| 5,901,205 A | 5/1999 | Smith et al. | 379/93.01 |
| 6,507,608 B1 | 1/2003 | Norrell | 375/219 |
| 6,563,821 B1 | 5/2003 | Hong et al. | 370/389 |
| 6,717,941 B1 | 4/2004 | Dwork | |
| 7,035,323 B1 | 4/2006 | Arato et al. | 375/222 |
| 7,099,426 B1 | 8/2006 | Cory et al. | 375/372 |
| 7,106,760 B1 | 9/2006 | Perumal et al. | 370/535 |
| 7,289,434 B2 * | 10/2007 | Fedorkow et al. | 370/219 |
| 7,295,639 B1 | 11/2007 | Cory | 375/371 |
| 7,298,694 B2 * | 11/2007 | Kamiya et al. | 370/218 |
| 7,310,310 B1 * | 12/2007 | Shenoi et al. | 370/235 |
| 7,349,480 B2 | 3/2008 | Tsatsanis et al. | 375/257 |
| 7,535,929 B2 | 5/2009 | Singhai et al. | 370/473 |
| 7,570,662 B2 | 8/2009 | Chinnaiah et al. | 370/473 |
| 7,573,834 B2 | 8/2009 | Liu et al. | 370/252 |
| 7,639,596 B2 | 12/2009 | Cioffi | 370/201 |
| 7,978,704 B2 * | 7/2011 | Sakakura et al. | 370/394 |
| 2003/0048802 A1 | 3/2003 | Shenoi | 370/458 |
| 2003/0091053 A1 | 5/2003 | Tzannes et al. | 370/395.1 |
| 2004/0109546 A1 | 6/2004 | Fishman | 379/93.01 |
| 2005/0058186 A1 | 3/2005 | Kryzak et al. | 375/219 |
| 2006/0126505 A1 | 6/2006 | Denney et al. | 370/229 |
| 2006/0126660 A1 | 6/2006 | Denney et al. | 370/468 |
| 2007/0058655 A1 | 3/2007 | Myers | 370/437 |
| 2007/0097907 A1 | 5/2007 | Cummings | 370/329 |
| 2007/0160040 A1 | 7/2007 | Kwon | 370/389 |

(Continued)

FOREIGN PATENT DOCUMENTS

| | | |
|---|---|---|
| JP | 11017661 | 1/1999 |
| WO | 2009022272 | 2/2009 |

OTHER PUBLICATIONS

"Ethernet-based multi-pair bonding" G.998.2 Amendment 2, ITU-T Standard, Dec. 2007, pp. 1-24.

(Continued)

*Primary Examiner* — Ian N Moore
*Assistant Examiner* — Latresa McCallum
(74) *Attorney, Agent, or Firm* — Fish & Richardson P.C.

(57) ABSTRACT

A system and method transmits data and receives data packets within a bonding engine. The data packets are fragmented into a plurality of packet fragments for communication across a bonded group of subscriber lines. A Frame Check Sequence (FCS) in the data packet is inverted on one direction of the bonding group to prevent any data packets from propagating towards the network during a loopback condition.

10 Claims, 8 Drawing Sheets

(56) References Cited

U.S. PATENT DOCUMENTS

| | | | |
|---|---|---|---|
| 2007/0183415 A1* | 8/2007 | Fischer et al. | 370/389 |
| 2008/0090562 A1* | 4/2008 | Divis et al. | 455/422.1 |
| 2008/0095062 A1* | 4/2008 | Shankar et al. | 370/249 |
| 2009/0135850 A1 | 5/2009 | Hong et al. | 370/468 |
| 2010/0027557 A1* | 2/2010 | McGarry et al. | 370/431 |
| 2011/0176412 A1* | 7/2011 | Stine et al. | 370/221 |

OTHER PUBLICATIONS

Written Opinion of the International Preliminary Examining Authority for PCT/US2012/027096 mailed on Apr. 11, 2013, 11 pages.
International Preliminary Report on Patentability from the International Preliminary Examining Authority for PCT/2012/027096 on Jun. 6, 2013, 25 pages.

* cited by examiner

BONDING ENGINE CONFIGURED TO PREVENT DATA PACKET FEEDBACK DURING A LOOPBACK CONDITION

FIELD OF THE INVENTION

The present invention relates to packet communications, and more particularly, this invention relates to communications systems that use bonding engines configured to bond together a plurality of communications links as subscriber line pairs.

BACKGROUND OF THE INVENTION

The standard Ethernet in the First Mile (EFM) bonding protocol is susceptible to looping back packets transparently when the underlying physical layer enters a loopback condition. This behavior has been shown in customer applications to cause the network feed to be disabled by a connected switch based on MAC address detection as a defense against DoS (Denial of Service). One troubling case in particular is when an entire shelf in a Multi-Service Access Platform (MSAP) such as a TA5000 from ADTRAN, INC. of Huntsville, Ala., has its network feed disabled as the result of a single DS1 tributary entering a loopback condition. In some networks, a proprietary BACP (Bonding Aggregation Control Protocol) loopback detection will automatically disable links in an EFM group that are looped back. However, any packets that are received prior to the BACP packet will pass through the EFM engine towards the network.

SUMMARY OF THE INVENTION

A system and method transmits data and receives data packets within a bonding engine. The data packets are fragmented into a plurality of packet fragments for communication across a bonded group of subscriber lines. A Frame Check Sequence (FCS) in the data packet is inverted on one direction of the bonding group to prevent any data packets from propagating towards the network during a loopback condition.

Any data packets that are fed back inadvertently will fail an FCS check within a defragmenter at the bonding engine. An offending subscriber line is disabled in the bonded group after a Bonding Aggregation Control Protocol (BACP) loopback detection is performed. A BACP Protocol Data Unit (PDU) is transmitted and has at least one additional bit indicating the ability to send and receive an inverted FCS. At least one additional bit in the BACP PDU indicates the status of whether packets are transmitted by a far-end bonding engine and were sent with an inverted FCS.

The method detects the ability of a far-end bonding engine to send and receive packets with an inverted FCS and negotiate which near-end or far-end bonding engine will transmit packets with an inverted FCS. Packets are transmitted having an inverted FCS from a link device or terminal having a lower MAC address from the links on both ends of the bonding groups that support FCS inversion. In another example, data packets are received within the bonding engine and the data packets are fragmented into a plurality of packet fragments for communication across a bonded group of subscriber lines. Each fragment is scrambled on a per-link basis to prevent any data packets from propagating towards the network during a loopback condition. In one example, any scrambling settings are negotiated across a link/group with overhead. Scrambling occurs at a link interface in anther example.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
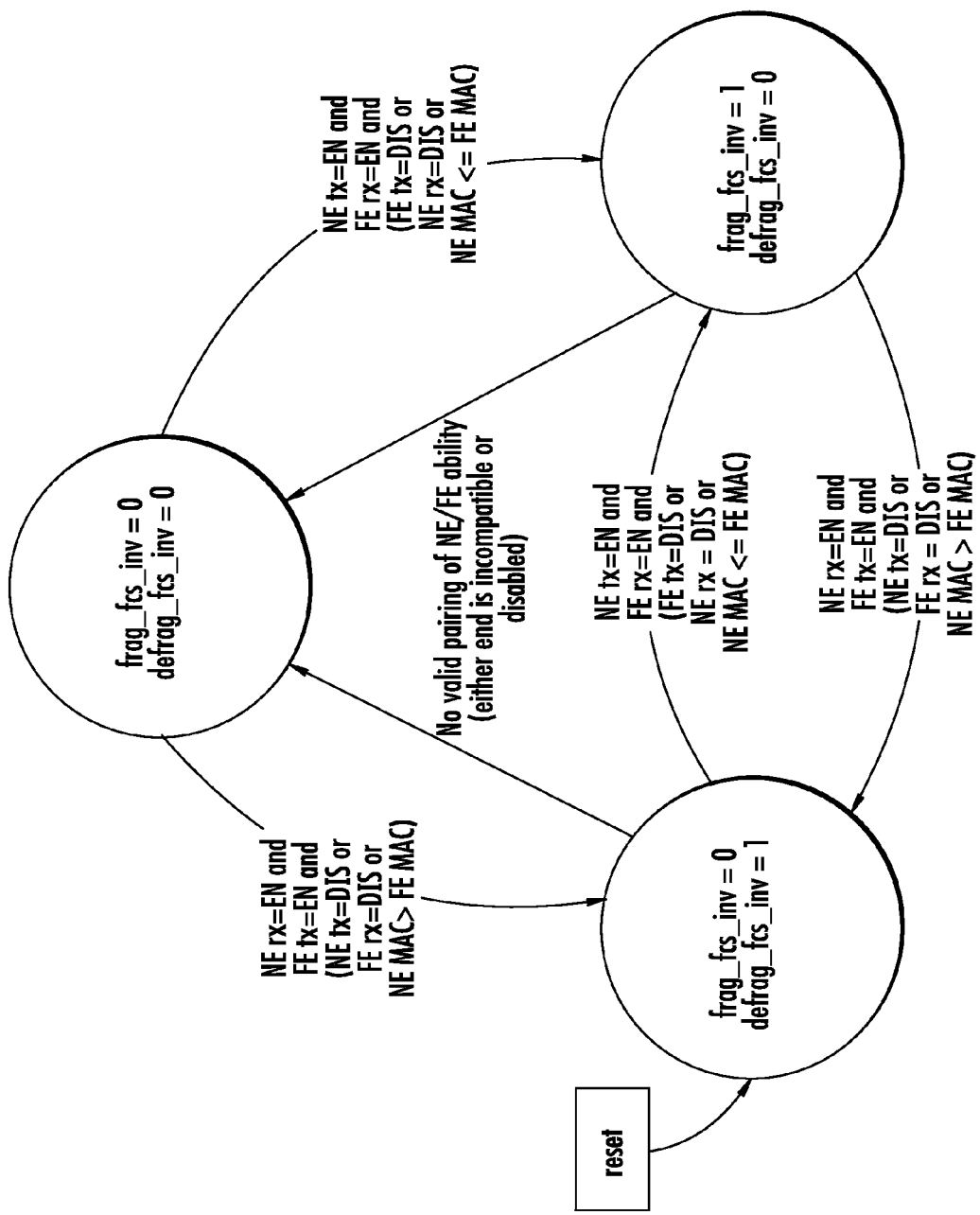
FIG. 1 is a state machine flowchart demonstrating the FCS inversion in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

In one non-limiting example, the system inverts the Ethernet FCS on one direction of each EFM bonding group so that any traffic that is fed back inadvertently will fail the FCS check in a defragmenter. The FCS failure prevents any packets from propagating towards the network, and the offending link can be disabled after a subsequent BACP loopback detection to determine the offending link.

The system automatically detects the ability of the far-end EFM bonding engine to send and receive packets with inverted FCS to negotiate which near-end (NE) or far-end (FE) bonding engine is actively transmitting packets with the inverted FCS. Software provisioning or detection can be used to ensure that both ends of the link are protected from passing looped-back received packets in the presence of a line loopback.

Any logical processing device can be used for the system, but in a specific example, the system is contained in FPGA firmware and operates in real-time to prevent excessive data loss or down time when operating in a compatible mode, a looped-back mode, or interfacing with legacy equipment such as supplied by ADTRAN, INC. or other vendor's equipment. As explained in detail below, additional bits have been introduced in the proprietary section of the BACP Protocol Data Unit (PDU) to indicate the capability to send and receive inverted FCS, as well as a status of whether packets transmitted by the bonding engine were sent with inverted FCS. In a case when links on both ends of the bonding group support FCS inversion, the one configured with a lower MAC address is nominated as the one to send packets with inverted FCS. BACP PDU's never have their FCS inverted regardless of the setting for the associated group.

It is possible to "scramble" instead of inverting the FCS at the end of the packet. It is possible to "scramble" each fragment on a per-link basis and the system negotiates the "scrambling" settings across a link/group with "overhead" rather than BACP PDU frames. It is also possible to either modify/scramble/insert overhead at the per-group level and make changes to packets or at the per-link level, making changes to fragments prior to the TC sublayer or scrambling the payload after the TC sublayer. There are many combinations that could be used. In one preferred and current implementation, the per-group inversion of the FCS in the packet is used.

The inversion of the 32-bit Ethernet FCS by the transmitting terminal (or link) will cause the receiving terminal (or link) to drop the packet in error, unless a rare error event occurs. The inversion of only the FCS (instead of the entire frame) permits a status check of whether or not the inversion is active to be toggled during the transmission of a packet without corruption. It is therefore possible to send an inverted FCS on all links on a transmitter, determined on a group-by-group basis. Furthermore, if a group's transmitter is inverting the FCS, its receiver should be prevented from inverting the FCS so that any looped-back packets will fail the FCS check and be terminated by the defragmentation in the bonding engine. BACP PDU's are typically never sent with an inverted FCS. It should be understood that the link/subscriber line may be ADSL, VDSL, HDSL, SHDSL, DS1, DS3, or any sub-variant thereof, or any future subscriber line protocol.

A determination is made as to which end of the link is inverting the FCS once the group becomes active, since only a single bonding engine on either end of a link is allowed to do so. Making this determination in firmware (instead of software) is consistent with the scope and rapidity of BACP and reduces the overall design, integration, and test phase, (especially if the software control is provisionable by menus/CLI/SNMP). Therefore, additional bits, and in a non-limiting example, three additional bits, are defined in the BACP PDU to convey the ability of either end of the bonding engine and link to invert the FCS, as well as the current status of whether or not the sending end is actively inverting the FCS.

The state machine flowchart (FIG. 1) demonstrates the per-group setting of FCS inversion. "Frag" corresponds to Fragment such as accomplished at a fragmenter circuit in a bonding engine and "Defrag" refers to Defragment such as accomplished in a defragmenter circuit in a bonding engine. There are three valid states: (1) the backwards-compatible default state (in which neither end is transmitting or receiving an inverted FCS); (2) defrag inverting incoming FCS; and (3) frag inverting outgoing FCS. Upon reset, the defrag is set to expect an inverted FCS, so as to prevent the near-end frag and near-end defrag communicating if a loopback is set prior to establishing a Transmission Convergence (TC) synchronization (sync). If at any time during operation the near-end terminal detects that the far-end link or terminal is incompatible, the unit will revert to non-inverted FCS operation on both frag and defrag. The far-end link or terminal will be determined as incompatible individually for transmit (Tx) and receive (Rx) if BACP packets are received with '0's in all bits, indicating FCS inversion capability/status. The far-end link will also be determined incompatible if no valid BACP PDUs (regardless of MAC address) have been received on any bonded link within 1.6384 seconds in a non-limiting example, provided that the link is in near-end and far-end TC (transmit control) sync.

Frag-side or defrag-side inversion will be selected automatically based on whether the register-based disable has been used to force either end to prohibit FCS inversion. In most circumstances, however, when both ends of a link are capable of both transmit and receive inversion, the links will use the MAC address on either end of the link to determine which unit performs the inversion. The lower MAC address will use FCS inversion on the fragmenter or transmit side, while the higher MAC address will use FCS inversion on the defragmenter or receive side. If the MAC addresses are equal (presuming a loopback), the packet at the fragmenter at the transmit link will have its FCS inverted and the defragmenter packet will be non-inverted.

In one non-limiting example, the ability and status bits are located in bits 6:4 in the 40th byte of the BACP PDU. Bit 7 typically indicates the proprietary and the far-end loopback detect status bit. Bit 6 advertises the near-end treatment FCS inversion capability. Bit 5 advertises near-end receive FCS inversion capability. Bit 4 indicates whether the current transmission has an inverted FCS (all bits are active-high positive indications). Bits 6 and 5 are set to '1' for all for firmware employing this code, but can be selectively set to '0' by the frag_con and defrag_con registers in the EFM (Ethernet in the First Mile) core.

BACP PDU's are employed on a per-link basis to convey timestamp and loopback information. The use of FCS inversion is made on a per-group basis. BACP frames may also be used to assist in identifying misconfigured groups. If, for example, two or more different MAC source addresses (besides the local MAC SA) appear in BACP frames received in the same group, the group may be disabled until the condition passes.

Figure 2A:
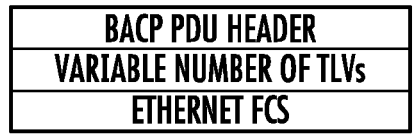
FIG. 2A is a block diagram of a BACP protocol data unit (PDU) showing the fixed header followed by a variable number of TLV's.

FIG. 2A shows a generic BACP PDU such as defined in the G.998-2 amendment 2 and showing the BACP PDU header and a variable number of TLV's and the Ethernet FCS. The BACP PDU header is fixed followed by the variable number of TLV's.

Figure 2B:
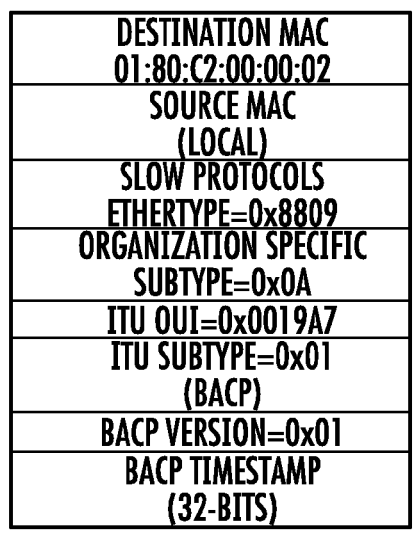
FIG. 2B is a block diagram showing an example header.
Figure 2C:
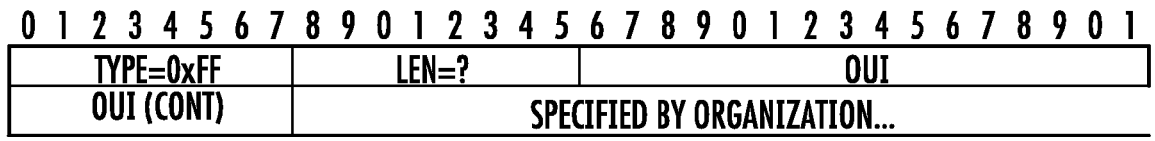
FIG. 2C shows an organization-specific TLV and showing an OUI that identifies the organization that specifies the syntax and semantics of the rest of the value field of the TLV.

FIG. 2B shows a BACP header as a slow protocol sub-type. Organizations may extend this protocol by including additional TLV information in the BACP PDU. This recommendation does not restrict or control organization-specific TLV's. They are controlled by the organization identified within the TLV. The format of an organization-specific TLV is shown in FIG. 2C. the organization-specific TLV's can be included in any BACP PDU. They can be any length. An OUI is used to identify the organization that specified the syntax and semantics of the rest of the value field of the TLV.

Figure 3:
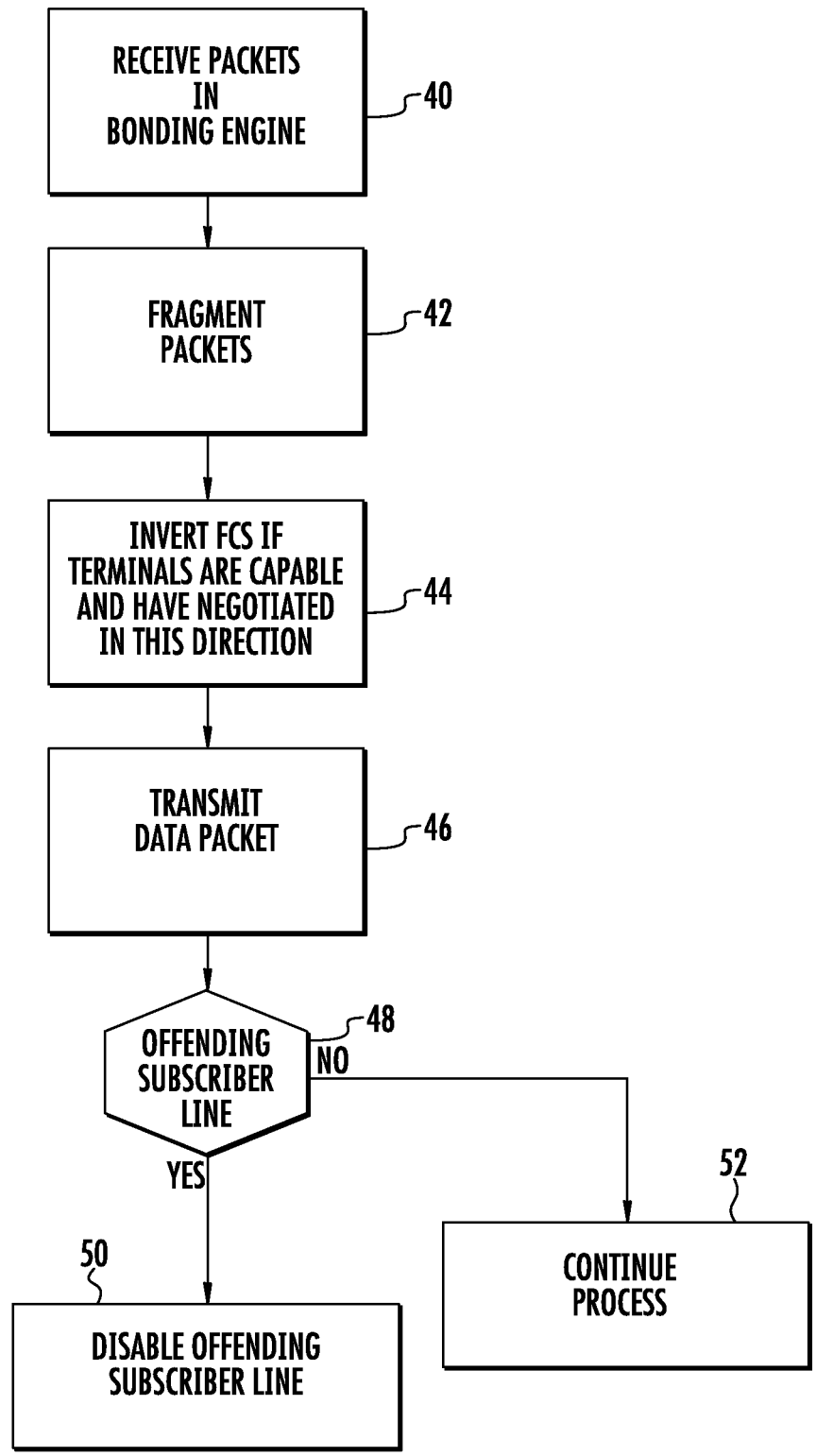
FIG. 3 is a high-level flowchart illustrating one example method in accordance with a non-limiting example.

FIG. 3 illustrates a high-level flowchart illustrating an example method that could be used for the inverted FCS functionality. The process begins by receiving data packets within a bonding engine (block 40). The data packets are fragmented into a plurality of packet fragments for communication across a bonded group of links, each of which is a logical representation of a physical subscriber line (block 42). A Frame Check Sequence (FCS) is inverted in the data packet on one direction of the bonding group (block 44) if the link terminals support inversion and have negotiated in this direction as explained above. The data packet is transmitted (block 46) and the inversion of the FCS prevents any data packets from propagating towards the network during a loopback condition.

A determination is made using BACP loopback detection whether there is an offending subscriber line in the bonded group (block 48). If so, the offending subscriber line is disabled (block 50). If not, the process continues (block 52).

There now follows details of example components and a communications system that can be used to allow the transmitting of data using the FCS inversion (or other modification) of a packet on a per-group basis, or the modification of each fragment on a per-link basis, or the scrambling of the TC payload on a per-subscriber-line basis, to prevent any data packets from propagating towards the network during a loopback condition. The preferred implementation uses FCS inversion on a per-group basis. This description is only a non-limiting example of the type of components that can be used.

It should be understood that typically a bonding engine within a network receives a data stream to be communicated to a customer premises (CP) and divides the data across subscriber lines extending from a network facility (e.g., a central office facility) to the customer premises. A bonding engine at the customer premises receives the data from the multiple subscriber lines and reassembles the data to form the original data stream received and divided by the network bonding engine. Similarly, a data stream to be communicated from the customer premises through the network is received by the CP bonding engine, which divides the data across the multiple subscriber lines. The network bonding engine receives such data and reassembles the data to form the original data stream received and divided by the CP bonding engine.

In a network facility, such as the central office, subscriber lines are terminated by circuitry residing on a "line card" typically a printed circuit board as part of a rack mounted module. There can be as many as several thousand line cards at one facility. These line cards are typically held in slots of several chassis. Each line card is also typically interfaced with a chassis backplane that enables the line card to communicate with various network devices and other equipment. An example chassis includes a MSAP from ADTRAN, INC., e.g., a TA5000.

Figure 4:
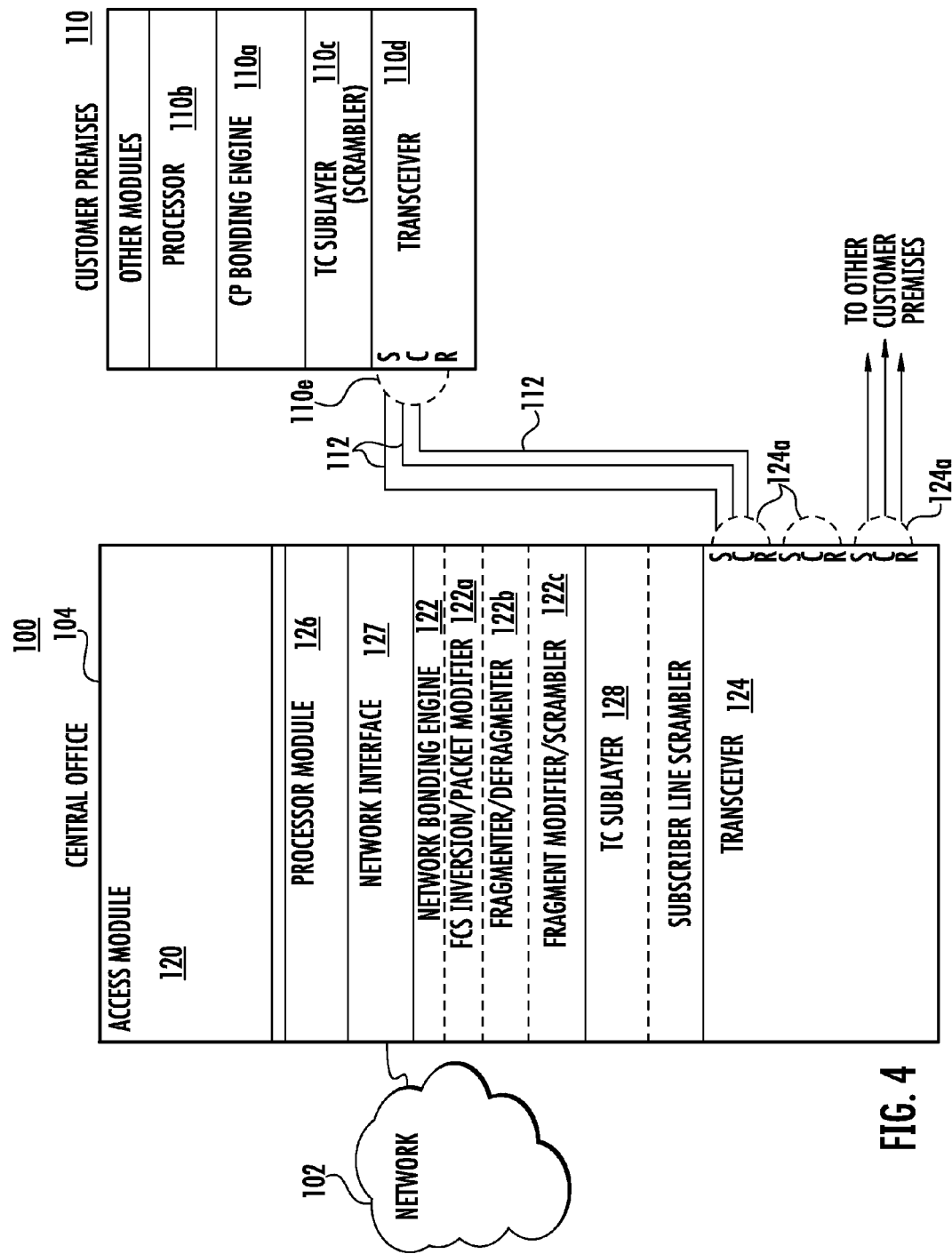
FIG. 4 is a block diagram showing an embodiment of a communications system having a network, central office facility, including a telecommunications access module and network bonding engine and communicating with a plurality of customer premises, which can be used in accordance with a non-limiting example.

FIG. 4 is a non-limiting example of a communications system 100 that can use the inverted FCS or scrambling as described above. The system 100 includes a network 102, such as the Public Switched Telephone Network (PSTN) or Internet, that routes data. A network facility, such as a central office (CO) 104, receives from the network 102 data destined for equipment or other devices at customer premises (CP) 110 (including bonding engine 110*a*) and transmits data to the customer premises via a plurality of communication links, such as the illustrated subscriber line pairs 112. Further, data from the customer premise 110 are received by the central office 104, which interfaces such data with the network for routing. Different protocols may be used for communication between the central office 104 and the customer premises 110, for example, various digital subscriber line (DSL) protocols, such as Asymmetric Digital Subscriber Line (ADSL), ADSL2, VDSL2, High-Bit-rate Digital Subscriber Line (HDSL), HDSL2, HDSL4, Very-high-data-rate Digital Subscriber Line (VDSL), etc. In other embodiments, other types of protocols may be used to communicate data between the central office 104 and the customer premises 110.

As shown in FIG. 4, the central office 104 includes at least one telecommunications access module 120, which includes at least one bonding engine 122. This access module includes a transceiver 124 and a processor module 126. The transceiver 124 and processor module 126 could be separate from or integral with the bonding engine 122. The access module could include other components as will be explained in greater detail below, including ports, memory, interfaces and buses.

The access module 120 typically can be formed as a Physical Medium Entity (PME) with each length terminated at one end via a network PME and the other end via a remote PME at the customer premises. The customer premises would also include a transceiver and typical processors using data processing logic with various customer premises equipment. The customer premises can include different types of processors, various ports, registers, databases, memory and control logic, including various registers and backplane interfaces. The bonding engine could be formed using different configurations, including an ASIC, a processor or a Field Programmable Gate Array.

As illustrated, a network interface 127 communicates with the network 102. The network bonding engine 122 includes various subcomponents as optional embodiments, including an FCS inversion/pocket modifier 122*a*; the fragmenter and defragmenter 122*b*; and the fragment modifier/scrambler 122*c*. A transmission convergence (TC) sublayer 128 is located between the network bonding engine and the transceiver 124. A plurality of SCR 124*a* are shown in dashed lines at the transceiver to indicate that they are optional and attached to the transceiver.

The transceiver 124 is connected to the various customer premises 110. Only one customer premises is illustrated in detail and the customer premises includes similar components as in the central office, including a processor module 110*b* and customer premises (CP) bonding engine 110*a* referred to above. Transmission control sublayer 110*c* is illustrated. The transceiver connects to optional SCR 110*e*. Multiple subscriber lines are illustrated and connected to the customer premises. For purposes of illustration, only three subscriber lines are illustrated. It should be understood that a number of customer premises can connect to the transceiver 124. It should be understood that the CP bonding engine 110*a* and TC sublayer 110*c* at the customer premises can include subcomponents similar to that of the central office.

The TC sublayer 128 is the layer in which Ethernet frames or EFM fragments are adapted to transparent data channels such as xDSL. In the specific case of EFM (also called "PTM") TC, there is a 65 byte frame with one byte allocated as overhead to assist in declaring whether the link is idle or carrying packets. Another example of a TC is the ATM TC, which uses the $5^{th}$ byte of the ATM cell to align the data into ATM cells at the receiver.

Figure 5:
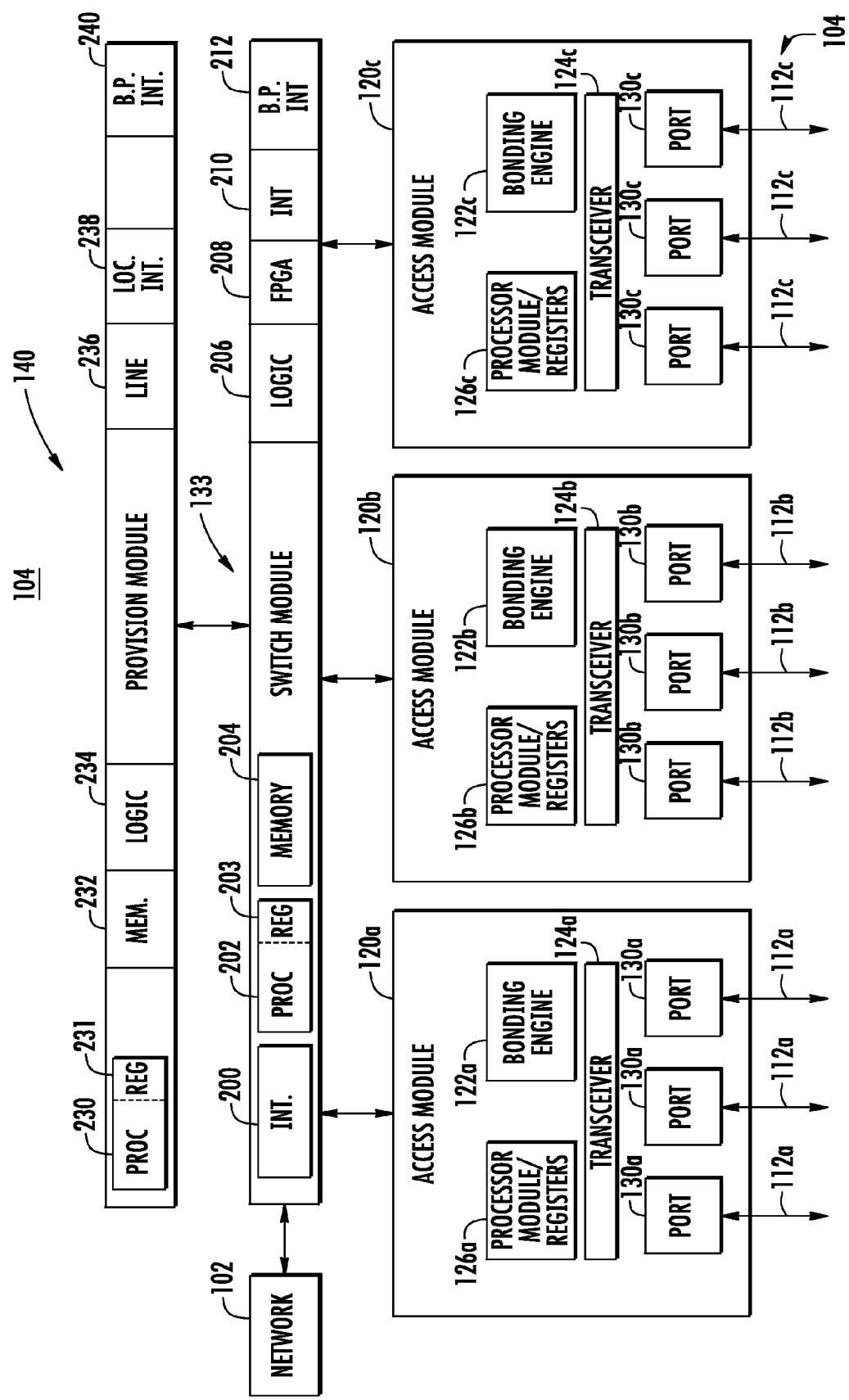
FIG. 5 is a block diagram showing greater details of the central office facility that includes a plurality of telecommunications access modules, a switch module and provision module in accordance with a non-limiting example.

FIG. 5 is an example of the bonding system components located, for example, at a central office 104. The central office has a plurality of access modules 120*a-c* that are coupled to and terminate subscriber lines 112*a-c*. In particular, the access modules have ports 130*a-c* that are respectively coupled to and interfaced with subscriber lines 112*a-c*. Each port has a unique address that identifies the port from the other ports of the other access modules. The port addresses may be used to switch data among the modules as will be described in more detail below.

As shown in FIG. 5, each access module 120*a-c* has at least one bonding engine 122*a-c* and at least one processor module 126*a-c*, which in one example, could be formed as a microprocessor or other controller. The processor module includes registers and associated circuitry, for example, any memory and control logic, which could be separate or part of the processor module. Each access module is coupled to a switch module 133, which switches data between the access modules and the network 102. A provision module 140 is illustrated. In this example, the switch module 133 receives from the network 102 data packets that are destined for equipment at the customer premise. Each data packet includes a header and a data portion. Control and routing information is included in the header, and payload data is included in the data portion. As an example, the header of the data packet may include a destination address identifying a communication device at the customer premises 110 to which the data packet is to be routed. In one non-limiting example, the header includes a Virtual Local Area Network (VLAN) tag. Other types of information may be included in the header, as is known in the art. In an example, the data packets are formed in accordance with Ethernet protocol, but other types of packet protocols may be used in other embodiments.

For each packet received from the network 102, in this non-limiting example, the switch module 133 transmits the packet to the appropriate access module based on information in the packet's header, such as the destination address or VLAN tag included in the header. In one example embodiment, all of the packets to be carried by the same bonding group (e.g., having the same destination address or VLAN tag) are routed to the same access module, but this is not necessary and routing could be to other access modules. When an original data packet is received by an access module, the bonding engine is configured to fragment the original data packet into a plurality of fragments. Each of the fragments is to be transmitted by a respective one of the subscriber lines of the bonding group. For each packet, control and routing information is included in the header, and payload data is included in the data portion. As an example, the header may identify the port address of the port 130a-c that is coupled to the subscriber line 112a-c that is to carry the packet fragment.

One or more of the subscriber lines 112a-c of a bonding group may be coupled to and terminated by the same access module on which the group's bonding engine resides. In that example, it is unnecessary for the fragments carried by such subscriber line to be transmitted through the switch module 133. When a bonding engine such as at 122a provides a fragment to be carried by its respective subscriber line 112a, the fragment is transmitted directly to the port 130a coupled directly to such subscriber line without being communicated through the switch module 133. However, fragments provided by the bonding engine 122a to be carried by subscriber lines 112b-c terminated by other modules 120b-c are transmitted to the switch module 133. For each such fragment, the switch module 133 analyzes the fragment's header, and based on the port address of such fragment, transmits the fragment to the access module 120b-c on which the identified port 130b-c resides. Thus, any of the bonding engines can bond any of the subscriber lines 112 regardless of whether a given subscriber line is terminated by the same access module on which the bonding engine resides.

For example, if provisioning, the provision module 140 operates together with the various access modules and switch module 133 to provision certain ports to form a bonding group by assessing the number of available subscriber line pairs that can be used and then adapting the maximum fragmentation size based on the line pairs. This fragmentation size is maintained as long as a line pair does not go out of service. If a line pair, such as perhaps on bonding engine 122b goes out of service, the fragmentation size is adjusted and the switch module operates to switch packets among the different ports. It is possible after provisioning to adapt dynamically the fragment size of a packet-by-packet basis. Thus, the provision module 140 is configured to provision the access modules together with the operation of the switch module and control the bonding process performed by access modules in a desired manner.

Figure 6:
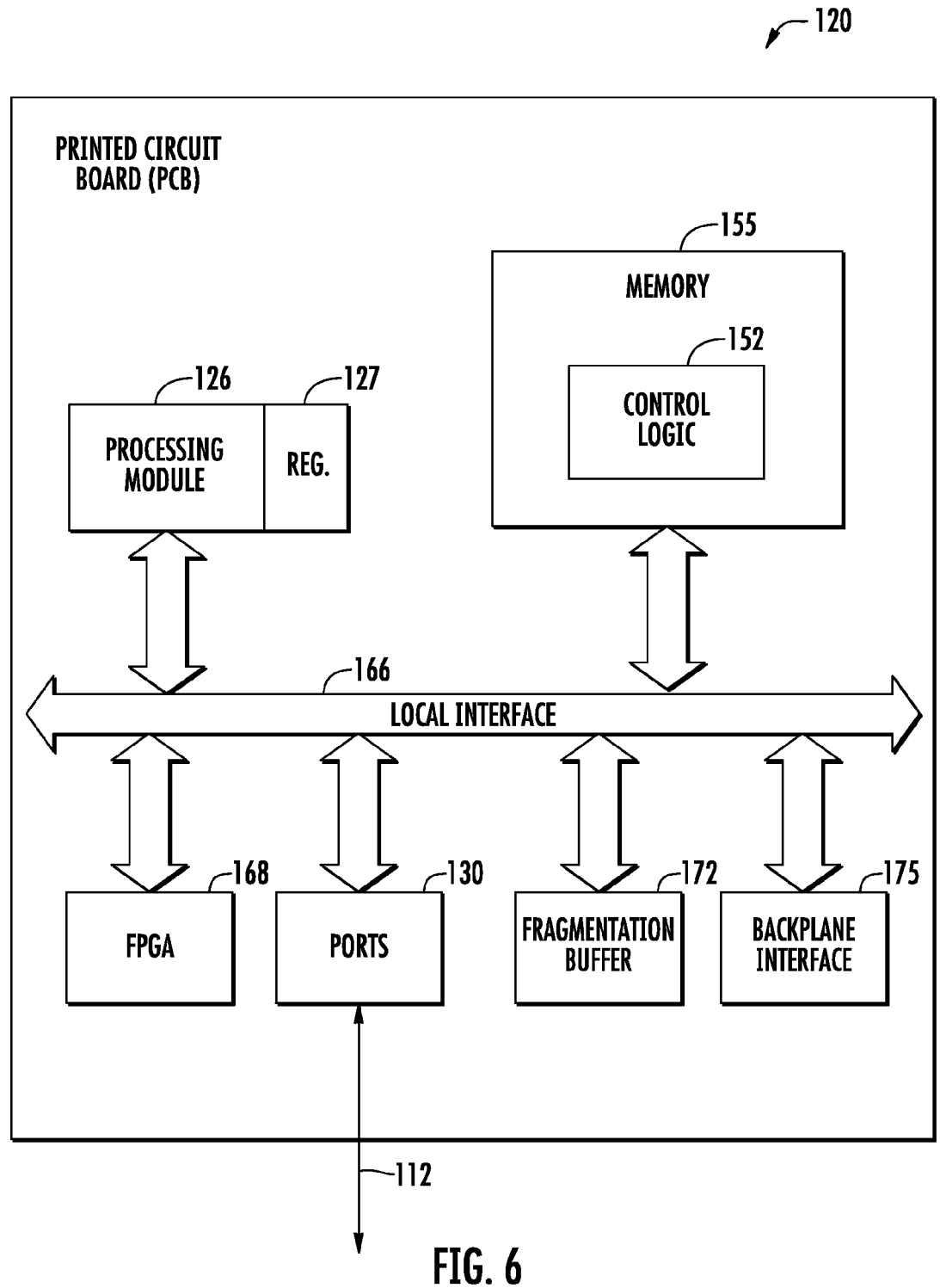
FIG. 6 is a more detailed block diagram showing an example of a telecommunications access module and various components that can be used in accordance with a non-limiting example.

Each access module 120a-c includes different hardware components configured to terminate and drive the subscriber lines 112a-c terminated by the access modules. These access modules may include, however, software, firmware, and/or other hardware for performing other functions. FIG. 6 is an example embodiment of an access module 120, which includes control logic 152 implemented in software and stored in a memory 155. The control logic 152, when implemented in software, can be stored and transported on any computer-readable medium for use by or in connection with an instruction execution apparatus that can fetch and execute instructions.

This example embodiment of the access module 120 includes the processing module 126 as noted before, for example, a digital signal processor (DSP) or a central processing unit (CPU), that communicates to and drives the other elements within the module 120 via a local interface 166, which can include at least one bus. For example, when the control logic 152 is implemented in software, the processing module 126 retrieves and executes instructions of the control logic 152. The processing module includes appropriate registers 127 in this example.

Furthermore, the access module 120 in one example includes a Field Programmable Gate Array (FPGA) 168 for implementing hardware portions of the module, such as the module's bonding engine 122 if such engine is implemented in hardware. The access module 120 also has registers as part of the processor module 126 configured to store various configuration settings. A backplane interface 175 includes a connector configured to interface the access module 120 with a backplane of a chassis (not shown) as will be described in more detail below. A fragmentation buffer 172 holds packet fragments.

The registers 127 as part of the processor module 126 store various configuration settings, which preferably specify how various data packets and/or fragments are to be processed. For example, the configuration settings may indicate which of the bonding engines 122a-c receive a fragment from a particular subscriber line 112a-c terminated by an access module 122a-c. Further, the configuration settings may indicate how fragments received from a bonding group or link on another access module are to be processed.

For example, the configuration settings may correlate the destination addresses or VLAN tags of data packets from the network 102 with port addresses. A bonding engine 122 residing on the module 120 may use the configuration settings to allocate fragments across the subscriber lines 112 of a bonding group. For example, the bonding engine 122 uses port addresses when fragmenting a data packet having the foregoing VLAN tag as described. The bonding engine 122 selects from the correlated port addresses for insertion into the fragment headers. Thus, the fragments from the data packet are transmitted to and carried by the subscriber lines of the bonding group.

The port addresses inserted into the fragment headers are used by the switch module 133 to switch the fragments. As described above, a group's bonding engine 122, based on the configuration settings in the registers of the processor module 126 and inserts a respective port address into the header of each fragment. Some of the fragments may be carried by "local" subscriber lines, and some of the fragments may be carried by "external" subscriber lines. A subscriber line is typically "local" relative to a particular access module 122 if it is coupled to a port on the access module such that the subscriber line is terminated by circuitry on that access module. On the other hand, a subscriber line is "external" relative to a particular access module if it is not terminated by that particular access module.

The switch module 133 as illustrated in FIG. 5 includes various components, including a local interface 200 and processing module 202, memory 204, control logic 206, a Field Programmable Gate Array (FPGA) 208, network interface 210, registers 203 as part of the processing module 202 and backplane interface 212 connected by various buses or local interface. The registers 203 could be separate from the processing module. The control logic 206 can be implemented in software and stored in memory and stored and transported on a computer-readable medium similar to the access module components, the processing module could be formed as a Digital Signal Processor (DSP) or a Central Processing Unit (CPU) that communicates to and drives other elements within the switch module 133 using the local interface such as at least one bus. The processing module 202 can retrieve and execute instructions of the control logic 206. The associated registers 203 are used in one example for storing various configuration settings. The backplane interface 212 includes a connector for interfacing the module with the backplane of a chassis (not shown). The FPGA 208 performs switching operations in one non-limiting example. It is possible that this switch module 133 could have a network interface coupled to a network connection such as a fiber optic cable. Configuration settings in the various registers 203 would indicate how data from a network would be switched. For example, a fragment could be received from an access module 120 and the FPGA would consult registers using the port address in the fragment's header and based on that information determine which of the modules is to receive the packet.

The provision module 140 is similarly configured with an appropriate processor module 230, registers 231, memory 232, control logic 234, line data 236 and a local interface 238 through a backplane interface 240. Provisioning requests are received into the provision module, which operates with the various access modules 120 and switch module 133, for example, at the central office 104. Any data packets received from the network 102 could have VLAN tags in their headers. Any registers could indicate where the packets are to be transmitted based on their VLAN tags.

Figure 7:
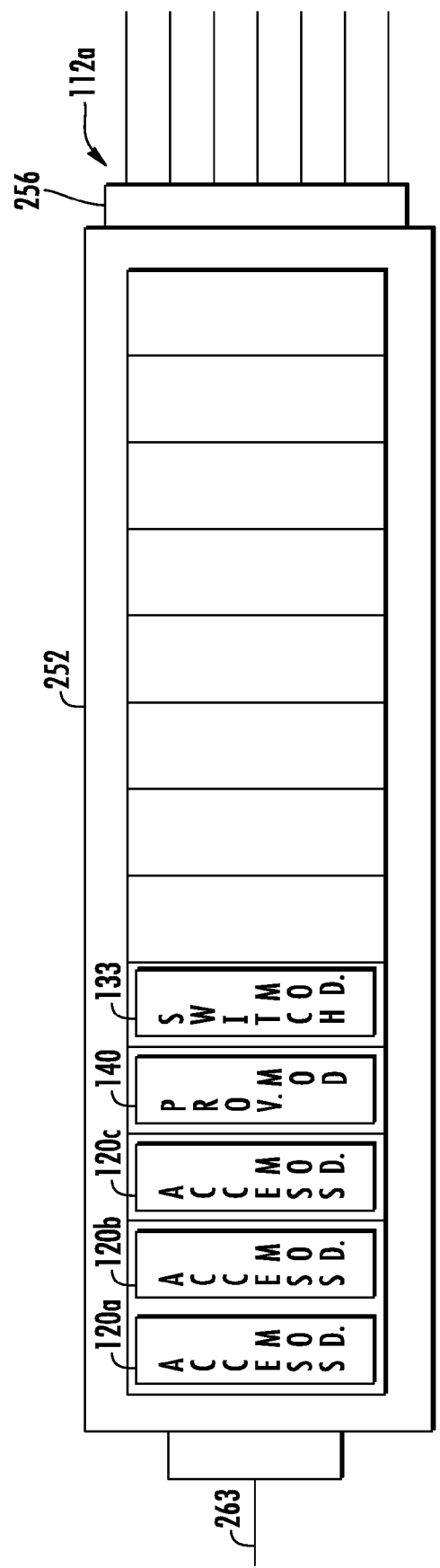
FIG. 7 is a block diagram showing an example of a chassis located at a central office facility that receives the various access modules, switch module and provision module in accordance with a non-limiting example.

In one non-limiting example shown in FIG. 7, the switch module 133, three access modules 122a-c, and the provision module 140 are respectively inserted into slots of a chassis 252, but any number of such modules can be inserted. Each of the subscriber lines 112a-c is coupled to a subscriber line interface 256 mounted on the chassis 252. In this embodiment, the subscriber line interface 256 interfaces the subscriber lines with a chassis backplane, which couples the subscriber lines to the access modules. The chassis backplane also couples each access module and provision module to the switch module 133. In this regard, the backplane comprises a plurality of conductive connections (e.g., copper traces) for conductively coupling the subscriber lines 112a-c and the access modules 120a-c, and provision module 140 to the switch module 133. The chassis backplane is conductively coupled to the backplane interface 175 of each access module (FIG. 5), the backplane interface 212 of the switch module 133, and the backplane interface 240 of the provision module 140.

A network connection 263, such as a fiber optic cable, for example, carrying a high-speed data stream is coupled to the switch module 133. If the network connection 263 is indeed fiber optic, the switch module 133 may include a fiber optic transceiver (not shown) to convert optical signals from the connection 263 into electrical signals and for converting electrical signals from the switch module 133 into optical signals.

Figure 8:
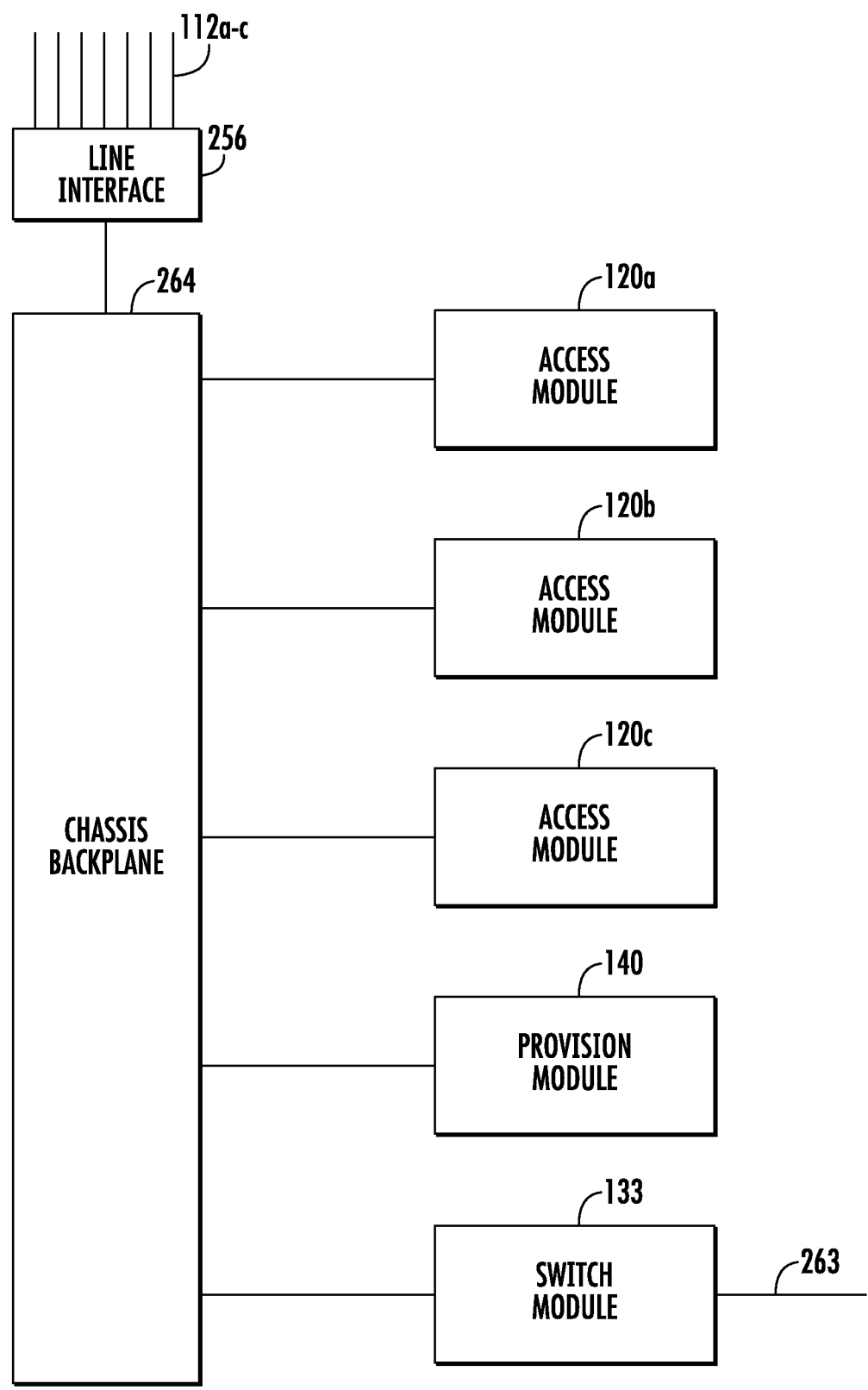
FIG. 8 is a block diagram showing an example of basic components of the access module, provision module and switch module connected to a chassis backplane in accordance with a non-limiting example.

The network connection 263 in another example may be coupled to the switch module 133 through the chassis backplane 264, and/or the subscriber lines and may be coupled directly to the access modules similar to how the network connection 263 is coupled directly to the switch module 133 (FIG. 8).

The provision module 140 is configured to provision the configuration settings of the different registers of the access modules 120 and any registers of the switch module 133. In this regard, the control logic of the provision module receives a provision request indicative of a bonding group to be added. For example, the provision request may include the port address of each port that is to be coupled to a subscriber line of a particular bonding group.

Although the description relative to the components shown in FIGS. 4-8 are non-limiting embodiments of a communications system that includes various access modules and components that can be used to implement FCS inversion or scrambling as described above, it should be understood that any different types of bonding systems can be used as non-limiting examples and as suggested by those skilled in the art. Only high-level components are illustrated because numerous and different variations of network systems and arrangements of components can be used to implement any necessary algorithms.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of transmitting data, comprising:
receiving, from a network, data packets within a first bonding engine that drops packets having a same frame check sequence (FCS) format as packets transmitted by the first bonding engine;
fragmenting the data packets into a plurality of packet fragments for communication across a bonded group of subscriber lines;
negotiating, by the first bonding engine and with a second bonding engine, that the second bonding engine to which the received data packets will be transmitted decodes packets having the same FCS format that the first bonding engine drops; and
modifying, by the first bonding engine, a frame check sequence (FCS) of the received data packets that are transmitted to the second bonding engine to prevent the received data packets from propagating towards the network during a loopback condition, the FCS of the received data packets being modified to have the same FCS format that is rejected by the first bonding engine;
disabling an offending subscriber line in the bonded group after determining the offending subscriber line using a bonding aggregation control protocol (BACP) loopback detection; and
transmitting at least one additional bit in the BACP protocol data unit (PDU) indicating a status of whether packets transmitted by the first bonding engine were sent with inverted FCS.

2. The method according to claim 1, wherein any data packets fed back will fail an FCS check within a defragmenter at the first bonding engine.

3. The method according to claim 1, and further comprising transmitting, by the second bonding engine a BACP protocol data unit (PDU) having at least one additional bit indicating an ability to send and receive an inverted FCS.

4. The method according to claim 1, and further comprising detecting an ability of a far-end bonding engine to send and receive packets with an inverted FCS and negotiate which near-end or far-end bonding engine will transmit packets with an inverted FCS.

5. A method comprising:
- receiving, from a network, data packets within a first bonding engine that drops packets having an inverted frame check sequence (FCS);
- fragmenting the data packets into a plurality of packet fragments for communication across a bonded group of subscriber lines;
- negotiating, by the first bonding engine and with a second bonding engine, that the second bonding engine to which the received data packets will be transmitted decodes packets having the inverted FCS format based on the first bonding engine having a lower MAC address than the second bonding engine; and
- inverting, by the first bonding engine, a frame check sequence (FCS) of the received data packets that are transmitted to the second bonding engine to prevent the received data packets from propagating towards the network during a loopback condition; and
- transmitting packets having the inverted FCS from the first bonding engine having the lower MAC address when the first bonding engine and second bonding engine both support FCS inversion.

6. A communications system, comprising:
- a first bonding engine that drops packets having a same frame check sequence (FCS) format as packets transmitted by the first bonding engine, receives packet data from a network, and bonds communications subscriber line pairs together to form a bonded group of communications subscriber line pairs over which packet fragments are transmitted to a second bonding engine and further comprising a packet fragmenter configured to fragment the data packets into a plurality of packet fragments for communication to the second bonding engine across the bonded group of communications subscriber line pairs, negotiate that the second bonding engine decodes packets having the same FCS format that are dropped by the first bonding engine, and modify a frame check sequence (FCS) within a data packet of the bonding group that will be transmitted to the second bonding engine to prevent any data packets transmitted by the first bonding engine from propagating towards the network, the FCS being modified to have the same FCS format that is dropped by the first bonding engine; and
- a transceiver configured to receive the packet fragments from the first bonding engine and transmit the packet fragments to the second bonding engine over the communications subscriber line pairs that form the bonding group; wherein:
  - said first bonding engine is configured to disable an offending subscriber line in the bonded group after the offending subscriber line has been determined using a bonding aggregation control protocol (BACP) loopback detection; and
  - said first bonding engine is configured to add at least one additional bit in the BACP protocol data unit (PDU) indicating a status of whether packets transmitted by the first bonding engine were sent with inverted FCS.

7. The communications system according to claim 6, and further comprising a defragmenter at the first bonding engine wherein any data packets fed back will fail an FCS check within the defragmenter.

8. The communications system according to claim 6, wherein said second bonding engine is configured to add at least one additional bit into a BACP protocol data unit (PDU) indicating an ability to send and receive an inverted FCS.

9. The communications system according to claim 6, and further comprising a processor operative with the network bonding engine and transceiver and configured to detect an ability of the second bonding engine to send and receive packets with an inverted FCS and negotiate which near-end or far-end bonding engine will transmit packets with an inverted FCS.

10. A communications system, comprising:
- a first bonding engine that drops packets having a same frame check sequence (FCS) format as packets transmitted by the first bonding engine, receives packet data from a network, and bonds communications subscriber line pairs together to form a bonded group of communications subscriber line pairs over which packet fragments are transmitted to a second bonding engine and further comprising a packet fragmenter configured to fragment the data packets into a plurality of packet fragments for communication to the second bonding engine across the bonded group of communications subscriber line pairs, negotiate that the second bonding engine decodes packets having the same FCS format that are dropped by the first bonding engine, and modify a frame check sequence (FCS) within a data packet of the bonding group that will be transmitted to the second bonding engine to prevent any data packets transmitted by the first bonding engine from propagating towards the network, the FCS being modified to have the same FCS format that is dropped by the first bonding engine;
- a transceiver configured to receive the packet fragments from the first bonding engine and transmit the packet fragments to the second bonding engine over the communications subscriber line pairs that form the bonding group; and
- a processor, wherein said processor is configured to select a bonding engine having a lower MAC address to invert the FCS when both bonding engines of a bonding group support FCS inversion.

\* \* \* \* \*